United States Patent
Ito et al.

(10) Patent No.: US 12,269,345 B2
(45) Date of Patent: *Apr. 8, 2025

(54) DISPLAY DEVICE FOR DISPLAYING OTHER VEHICLES AND DISPLAY METHOD FOR DISPLAYING OTHER VEHICLES

(71) Applicant: TOYOTA JIDOSHA KABUSHIKI KAISHA, Toyota (JP)

(72) Inventors: Hironori Ito, Tokyo-to (JP); Takeshi Matsumura, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/462,726

(22) Filed: Sep. 7, 2023

(65) Prior Publication Data

US 2023/0415575 A1 Dec. 28, 2023

Related U.S. Application Data

(63) Continuation of application No. 17/502,444, filed on Oct. 15, 2021, now Pat. No. 11,794,580.

(30) Foreign Application Priority Data

Oct. 19, 2020 (JP) .................................. 2020-175578

(51) Int. Cl.
*B60K 35/00* (2024.01)
*B60K 35/28* (2024.01)
(Continued)

(52) U.S. Cl.
CPC ............... *B60K 35/00* (2013.01); *G06F 3/14* (2013.01); *G08G 1/0112* (2013.01); *B60K 35/28* (2024.01); *B60K 2360/16* (2024.01)

(58) Field of Classification Search
None
See application file for complete search history.

(56) References Cited

U.S. PATENT DOCUMENTS 6,559,761 B1 * 5/2003 Miller ...................... B60R 1/00
367/909
9,318,018 B2 4/2016 Park et al.
(Continued)

FOREIGN PATENT DOCUMENTS

| CN | 102785620 A | 11/2012 |
|----|-------------|---------|
| CN | 107074110 A | 8/2017 |

(Continued)

OTHER PUBLICATIONS

Hironori Ito et al., U.S. Appl. No. 17/502,444, Non-Final Rejection issued Aug. 3, 2022.
(Continued)

*Primary Examiner* — Jason A Pringle-Parker
(74) *Attorney, Agent, or Firm* — Dickinson Wright, PLLC (57) ABSTRACT

A display device displays a host vehicle and other vehicles running in driving lanes together with the driving lanes on an information display screen. When the other vehicles are present at a far region at a front side in a direction of vehicle advance outside a display range of the screen, the display device displays marks showing that the other vehicles are present at a far region at a front side in a direction of vehicle advance outside a display range of the screen at fixed positions of the driving lanes displayed on the screen.

9 Claims, 9 Drawing Sheets

(51) Int. Cl.
*G06F 3/14* (2006.01)
*G08G 1/01* (2006.01)

(56) References Cited

U.S. PATENT DOCUMENTS

| | | | |
|---|---|---|---|
| 9,969,267 B2 | 5/2018 | McNew | |
| 10,077,983 B2 | 9/2018 | Okuda et al. | |
| 10,464,421 B2 | 11/2019 | Watanabe et al. | |
| 11,034,363 B2 | 6/2021 | Choi et al. | |
| 2002/0149476 A1 | 10/2002 | Ogura | |
| 2008/0151054 A1 | 6/2008 | Kubota et al. | |
| 2008/0158249 A1 | 7/2008 | Jarczyk | |
| 2010/0123778 A1* | 5/2010 | Hada | G08G 1/162 348/148 |
| 2012/0274504 A1 | 11/2012 | Kubota | |
| 2012/0296561 A1 | 11/2012 | Park et al. | |
| 2014/0063064 A1 | 3/2014 | Seo et al. | |
| 2016/0021155 A1 | 1/2016 | Sawato | |
| 2016/0148503 A1 | 5/2016 | Kachi et al. | |
| 2016/0176358 A1 | 6/2016 | Raghu et al. | |
| 2016/0365068 A1* | 12/2016 | Sakaguchi | B60K 35/00 |
| 2017/0076598 A1 | 3/2017 | Scofield et al. | |
| 2017/0076600 A1 | 3/2017 | Scofield | |
| 2017/0084175 A1* | 3/2017 | Sedlik | B60W 40/08 |
| 2017/0132922 A1 | 5/2017 | Gupta et al. | |
| 2017/0309257 A1 | 10/2017 | Akita et al. | |
| 2018/0101736 A1 | 4/2018 | Han et al. | |
| 2018/0136656 A1 | 5/2018 | Rasmusson, Jr. et al. | |
| 2018/0137373 A1 | 5/2018 | Rasmusson, Jr. et al. | |
| 2018/0273050 A1 | 9/2018 | Tertoolen et al. | |
| 2019/0049724 A1 | 2/2019 | Kimura et al. | |
| 2023/0415575 A1* | 12/2023 | Ito | G09G 5/37 |

FOREIGN PATENT DOCUMENTS

| | | |
|---|---|---|
| JP | 2004050923 A | 2/2004 |
| JP | 4952421 B | 3/2012 |
| JP | 2016062368 A | 4/2016 |
| JP | 2016182906 A | 10/2016 |
| JP | 2017041126 A | 2/2017 |
| JP | 6349890 B | 6/2018 |
| JP | 2019196082 A | 11/2019 |

OTHER PUBLICATIONS

Hironori Ito et al., U.S. Appl. No. 17/502,444, Final Rejection issued Oct. 12, 2022.

Hironori Ito et al., U.S. Appl. No. 17/502,444, Advisory Action issued Jan. 27, 2023.

Hironori Ito et al., U.S. Appl. No. 17/502,444, Non-Final Rejection issued Mar. 20, 2023.

Hironori Ito et al., U.S. Appl. No. 17/502,444, Notice of Allowance issued Jun. 12, 2023.

* cited by examiner

REGION IN FRONT OF HOST VEHICLE OUTSIDE DISPLAY RANGE

DISPLAY DEVICE FOR DISPLAYING OTHER VEHICLES AND DISPLAY METHOD FOR DISPLAYING OTHER VEHICLES

RELATED APPLICATIONS

This application is a continuation of U.S. patent application Ser. No. 17/502,444, filed Oct. 15, 2021, which claims priority to JP Patent Application No. 2020-175578, filed Oct. 19, 2020, the specification, claims and abstract of which are incorporated herein in their entireties.

FIELD

The present disclosure relates to a display device and display method.

BACKGROUND

In driver assistance by a driver assistance system mounted in a vehicle, it is desirable to disclose the information acquired at the vehicle side to the driver. Japanese Unexamined Patent Publication No. 2016-182906 discloses to recognize other vehicles present in surroundings of a host vehicle and display the recognized other vehicles around an automobile icon representing the host vehicle on an information display screen (for example, instrument panel display).

SUMMARY

If the range of recognition of the other vehicles present in the surroundings of the host vehicle were enlarged, other vehicles present far away would be able to be recognized. However, even if recognizing other vehicles present far away, there is the problem that if the positions of the other vehicles were outside the display range of the information display screen, the fact of the other vehicles being recognized could not be conveyed to the driver.

The present disclosure was made focusing on such a problem and has its object to enable the fact of recognition of other vehicles far away present outside a display range of an information display screen to be conveyed to a driver.

To solve this problem, a display device according to one aspect of the present disclosure is configured to display a host vehicle and other vehicles running in driving lanes together with the driving lanes on an information display screen. Further, the display device is further configured to display marks showing that the other vehicles are present in a region, that is a far region at a front side in a direction of vehicle advance outside a display range of the information display screen, at fixed positions of their driving lanes displayed on the information display screen, when the other vehicles are present at that region.

Further, a display method according to another aspect of the present disclosure is a display method displaying a host vehicle and other vehicles running in driving lanes together with the driving lanes on an information display screen, comprising judging whether the other vehicles are present at a far region at a front side in a direction of vehicle advance outside a display range of the information display screen and, when the other vehicles are present in that region, displaying marks showing that the other vehicles are present in that region at fixed positions of their driving lane displayed on the information display screen.

According to these aspects of the present disclosure, it is possible to convey the fact of recognition of other vehicles far away present outside the display range of the information display screen to the driver.

DESCRIPTION OF EMBODIMENTS

Below, referring to the drawings, embodiments of the present disclosure will be explained in detail. Note that, in the following explanation, similar constituent elements will be assigned the same reference notations.

First Embodiment

Figure 1:
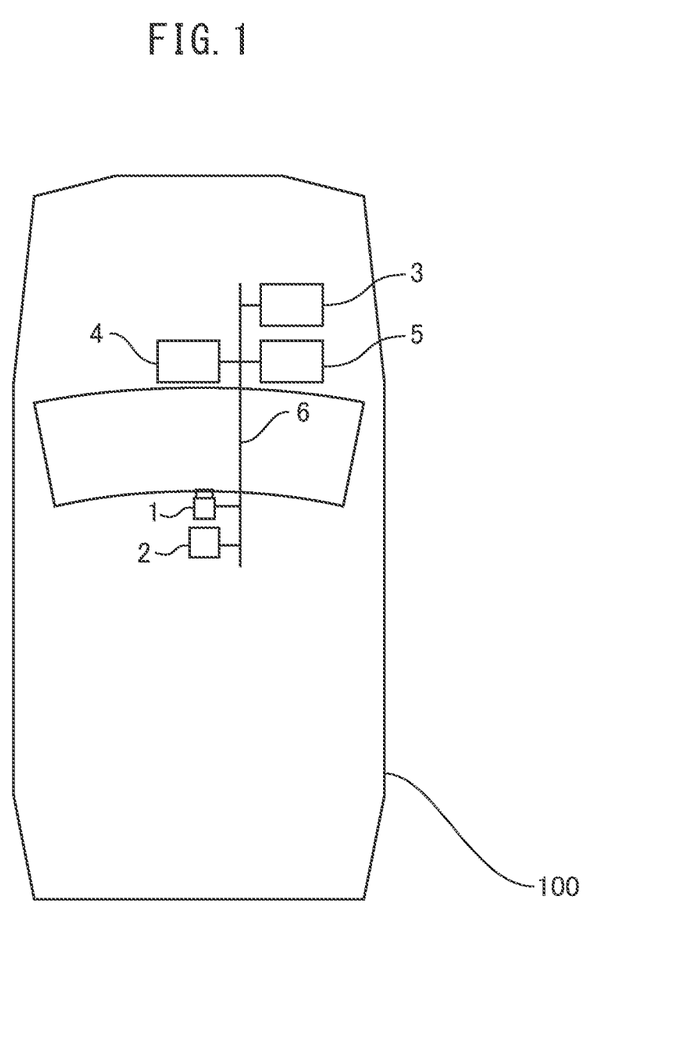
FIG. 1 is a schematic view of a system of a vehicle according to a first embodiment of the present disclosure.

FIG. 1 is a schematic view of a system of a vehicle 100 according to a first embodiment of the present disclosure.

The vehicle 100 is provided with a camera 1, distance measurement sensor 2, object recognition device 3, display device 4, and a vehicle control device 5. The camera 1, distance measurement sensor 2, object recognition device 3, display device 4, and vehicle control device are respectively connected through an internal vehicle network 6 based on the Controller Area Network standard to be able to communicate.

The camera 1 is for example attached inside a passenger compartment of the vehicle 100 so as to face the region in front of the vehicle 100. It captures the region in front of the vehicle 100 by a predetermined frame rate (for example, 10 Hz to 40 Hz) and generate images in which the front region is shown (below, referred to as the "camera images"). Further, each time generating a camera image, the camera 1 sends the generated camera image through the internal vehicle network 6 to the vehicle control device 5.

Figure 2:
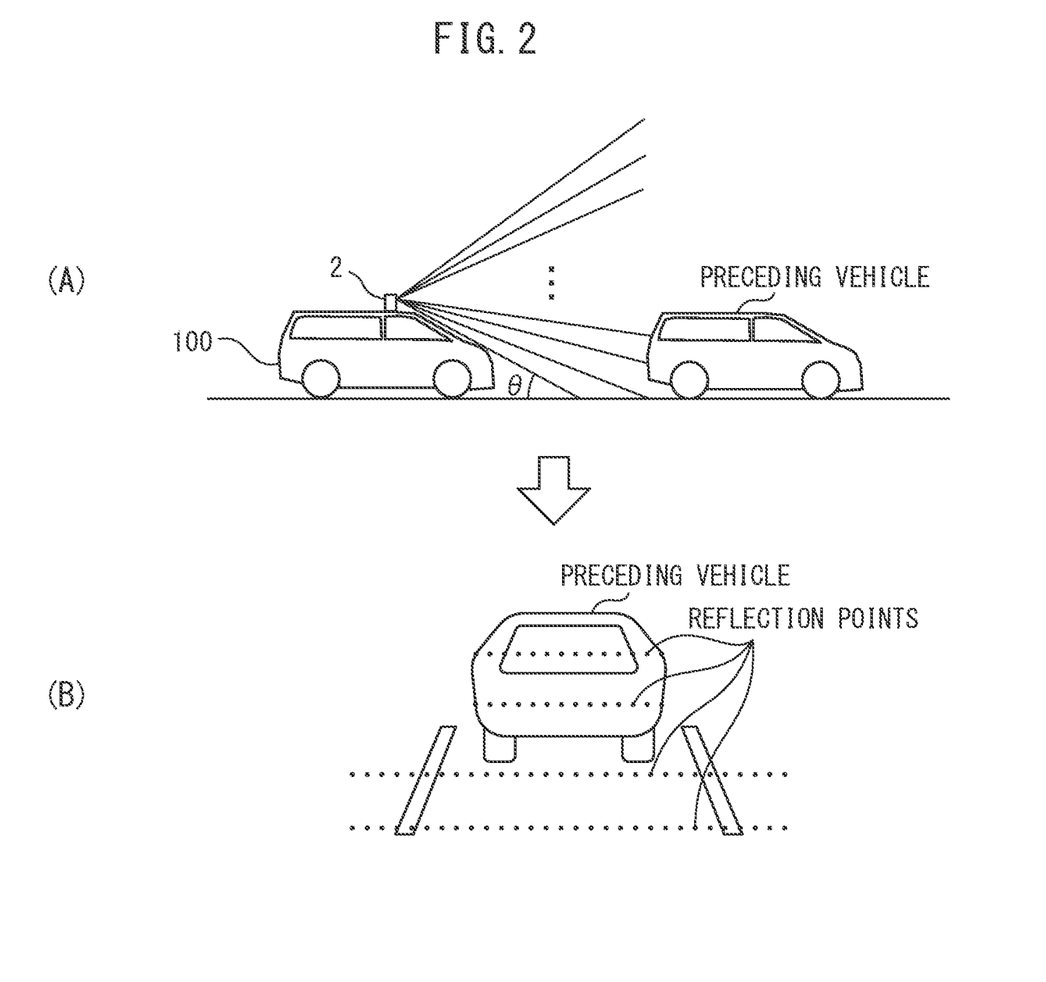
FIG. 2 is a view explaining operation of a distance measurement sensor.

The distance measurement sensor 2 emits a plurality of laser beams or radio waves differing in emission angle horizontally and in parallel to the distance measurement region of the surroundings of the vehicle 100 as shown in (A) of FIG. 2 and receives the reflected beams of the emitted laser beams or the reflected waves of the emitted radio waves. Further, based on the received reflected beams or reflected waves, the distance measurement sensor 2 measures the distances to roads or obstacles (for example, buildings, preceding vehicles or following vehicles on the roads, oncoming vehicles, and other such running vehicles, stopped vehicles, curbs, fallen objects, pedestrians, etc.) present in the distance measurement region. The distances to the roads or obstacles, as shown in (B) of FIG. 2, are acquired for each of the reflection points (emission points) of the laser beams or radio waves. The distance measurement sensor 2 links the distances to the reflection points and the coordinate information of the reflection points, then sends these as distance measurement data through the internal vehicle network 6 to the object recognition device 3.

As the distance measurement sensor 2 emitting the laser beams, for example, a LIDAR (light detection and ranging) device may be mentioned. Further, as a distance measurement sensor 2 emitting the radio waves, for example, a milliwave radar sensor may be mentioned. In the present embodiment, as shown in (A) of FIG. 2, as the distance measurement sensor 2, a LIDAR device attached to the roof of the vehicle 100 is used.

Based on the distance measurement data, the object recognition device 3 recognizes the other vehicles present in the surroundings of the vehicle 100 and sends information relating to the recognized other vehicles (below, referred to as the "other-vehicle information") through the internal vehicle network 6 to the display device 4 and vehicle control device 5. Specifically, the object recognition device 3 groups reflection points satisfying predetermined conditions among the plurality of reflection points detected based on the reflections of the emitted laser beams etc. as reflection points of the laser beams reflected from the same objects to thereby recognize the other vehicles present in the surroundings of the vehicle 100. Note that in the following explanation, to clearly differentiate the vehicle 100 and the other vehicles present in the surroundings of the vehicle 100, sometimes, in accordance with need, the vehicle 100 will be referred to as the "host vehicle 100".

Figure 3:
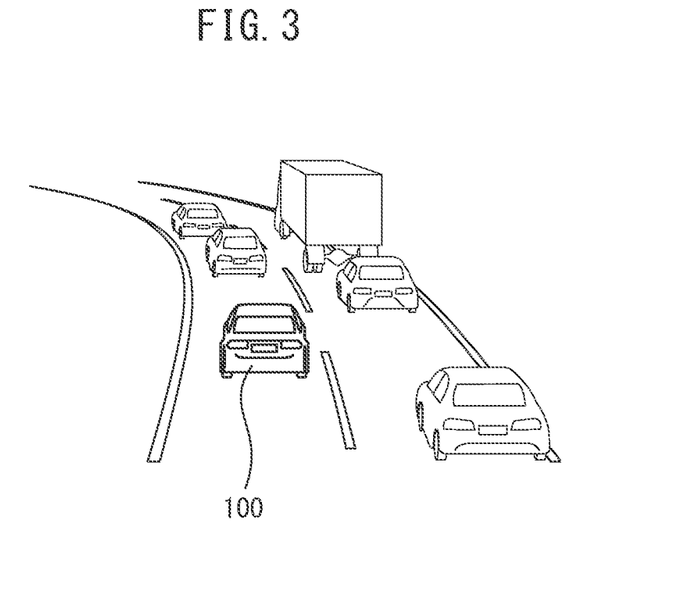
FIG. 3 is a view showing an example of a display in a case of displaying other vehicles present in surroundings of the vehicle together with the vehicle on an information display screen.

The display device 4 is provided with an information display screen 44 (see FIG. 4) arranged at a position which a driver of the vehicle 100 can see. The information display screen 44, for example, is a liquid crystal display or organic EL display or other of various types of displays. The other-vehicle information sent from the object recognition device 3 includes identification information of the other vehicles (ID numbers assigned to the vehicles at the time of recognition etc.), type information of the other vehicles (passenger cars or trucks, motorcycles, etc.), position information of the other vehicles when based on the vehicle 100 (relative position information), the presence of any other vehicles running in front of the vehicle 100 and in the same lane as the vehicle 100 (below, referred to as "preceding vehicles"), preceding vehicle information relating to the vehicle-vehicle distance from the preceding vehicles, etc. Based on this other-vehicle information, the display device 4 according to the present embodiment, for example, as shown in FIG. 3, displays the other vehicles present in the surroundings of the vehicle 100 together with the vehicle 100 on the information display screen 44. Specifically, as shown in FIG. 3, if the other vehicles are passenger cars, the display device 4 displays predetermined passenger car-use icons at the relative positions of the other vehicles. In the same way, if the other vehicles are trucks, it displays predetermined truck-use icons at the relative positions of the other vehicles. While not shown, if the other vehicles are motorcycles, it displays predetermined motorcycle-use icons at the relative positions of the other vehicles.

The vehicle control device 5 receives as input, in addition the above-mentioned camera images and other-vehicle information, various types of information (for example, information on appearance of driver, current position information of the vehicle 100, vehicle speed information, etc.) required for performing various types of driver assistance for automatically performing part or all of the driving operations relating to acceleration, steering, and braking. Further, the vehicle control device 5 prepares a driving plan of the vehicle 100 based on these information and automatically performs part or all of the driving operations relating to acceleration, steering, and braking in accordance with this driving plan. Note that, "acceleration, steering, and braking" may, for example, also be read as "acceleration, deceleration, and turning" or "driving, braking, and steering" etc.

Figure 4:
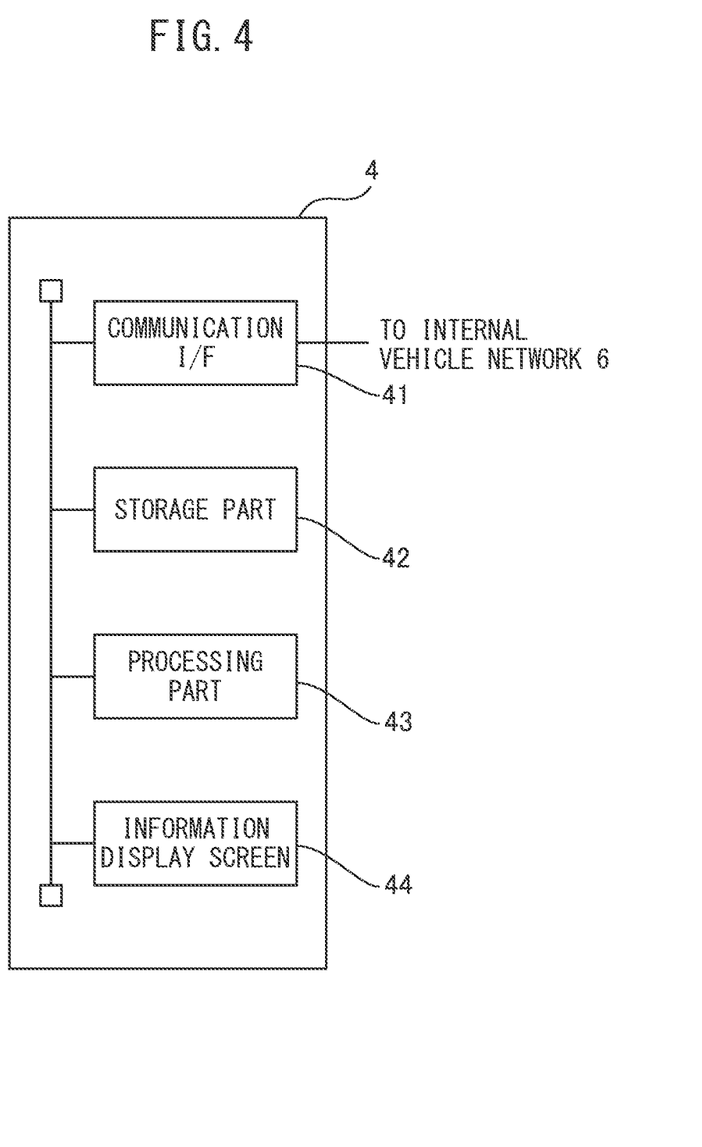
FIG. 4 is a view showing a hardware configuration of a display device according to a first embodiment of the present disclosure.

FIG. 4 is a view showing the hardware configuration of the display device 4.

As shown in FIG. 4, the display device 4 is provided with a communication interface 41, storage part 42, processing part 43, and information display screen 44.

The communication interface 41 is provided with an interface circuit for connecting the display device 4 to the internal vehicle network 6. That is, the communication interface 41 is connected through the internal vehicle network 6 to the object recognition device 3. The communication interface 41 transfers the received other-vehicle information to the processing part 43 each time receiving other-vehicle information from the object recognition device 3.

The storage part 42 has a HDD (hard disk drive) or optical recording medium, semiconductor memory, or other storage medium and stores various types of computer programs or data etc. used for processing at the processing part 43.

The processing part 43 has one or more processors and their peripheral circuits. The processing part 43 runs the various types of computer programs stored at the storage part 42 and comprehensively controls the overall operation of the display device 4 and is, for example, a CPU (central processing unit). Based on the other-vehicle information received through the communication interface 41, the processing part 43 executes display processing for displaying the other vehicles present in the surroundings of the vehicle 100 on the information display screen 44. Details of this display processing will be explained later while referring to FIG. 5.

The information display screen 44, as explained above, for example, is a liquid crystal display or organic EL display or other of various types of displays which is arranged at a position which the driver of the vehicle 100 can see and which displays information (for example, text information or image information) in accordance with signals output from the processing part 43.

Note that the hardware configurations of the object recognition device 3 and vehicle control device 5 are not shown, but in the same way as the display device 4, they are provided with communication interfaces, storage parts, and processing parts.

Here, in the driver assistance by the vehicle control device 5, information acquired at the vehicle side is shown to the driver to convey to the driver whether the information acquired at the vehicle side is accurate etc. Therefore, in the present embodiment, as shown in FIG. 3, the other vehicles present in the surroundings of the vehicle 100 acquired at the vehicle side, that is, the other vehicles present in the surroundings of the vehicle 100 recognized by the object recognition device 3, is made to be displayed by the display device 4 at the information display screen 44.

At this time, if the range of recognition of other vehicles by the object recognition device 3 were enlarged, other vehicles present far away could also be recognized. However, if trying to make all recognized other vehicles be displayed on the information display screen 44, it would be necessary to reduce the scale the more the range of recognition of the other vehicles were enlarged. As a result, there is the problem that the displays of the other vehicles would become smaller and harder to see.

On the other hand, if maintaining as is the scale at a suitable scale of the same extent as up to now, there is the problem that even if recognizing other vehicles present far away in the front, if the positions of the other vehicles were outside the display range of the information display screen 44, the other vehicles could not be displayed at the information display screen 44 and therefore the fact of recognition of other vehicles present far away in the front could not be conveyed to the driver. For example, if displaying other vehicles present in a region up to 100 meters in front of the host vehicle 100 on the information display screen 44, when recognizing another vehicle present at a position 150 meters in the front, that other vehicle present at a position 150 meters in the front would be another vehicle positioned outside the display range of the information display screen 44 and that other vehicle could no longer be displayed at the information display screen 44.

Figure 5:
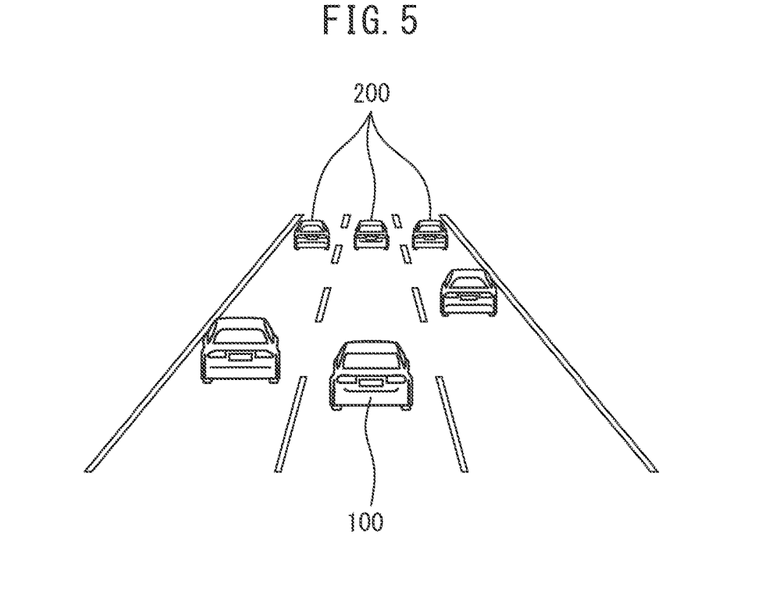
FIG. 5 is a view showing one example of an information display screen according to the first embodiment of the present disclosure showing other vehicles running in a region in the front of the host vehicle outside the display range as other-vehicle recognition marks at fixed positions of the driving lanes.

Therefore, in the present embodiment, when recognizing another vehicle running in a region in front of the host vehicle 100 outside the display range of the information display screen 44 (below, referred to as a "region in the front of the host vehicle outside the display range"), as shown in FIG. 5, it was decided to display a predetermined other-vehicle recognition mark 200 showing that another vehicle has been recognized at a fixed position of the driving lane at which that other vehicle is running, for example, at the end part of the front side in the direction of vehicle advance. Note that, in the present embodiment, the other-vehicle recognition mark 200, as shown in FIG. 5, is made a vehicle icon similar to the host vehicle 100 etc., but the disclosure is not limited to this. For example, a simple symbol, word, etc. may also be made the other-vehicle recognition mark 200.

In this way, when recognizing another vehicle running in the region in the front of the host vehicle outside the display range, by displaying the other-vehicle recognition mark 200 at a fixed position of the driving lane in which that other vehicle is running (the end part of the front side in the direction of vehicle advance), it is possible to maintain a suitable scale and secure ease of viewing of the screen while conveying the fact of recognition of another vehicle present far away to the driver.

Note that, in the example shown in FIG. 5, other-vehicle marks 200 are displayed in the driving lane in which the host vehicle 100 is running (below, referred to as the "host vehicle driving lane") and the left and right adjacent driving lanes adjacent to the host vehicle driving lane, so this means there are other vehicles running at the host vehicle driving lane and left and right adjacent driving lanes outside the display range of the information display screen 44.

Figure 6:
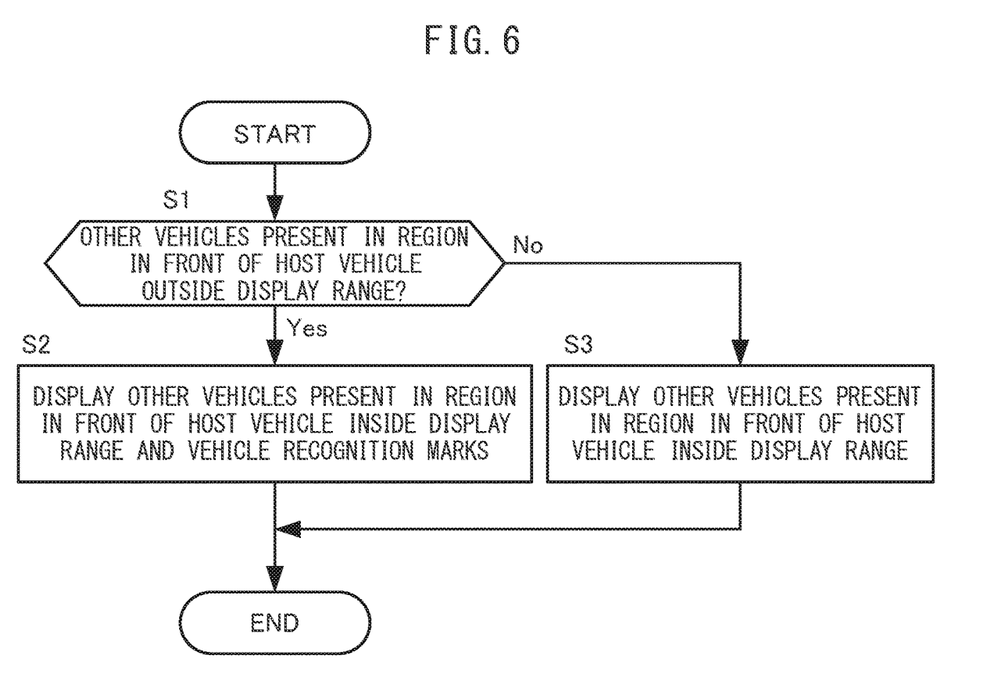
FIG. 6 is a flow chart explaining display processing according to the first embodiment of the present disclosure.

FIG. 6 is a flow chart explaining details of the display processing according to the present embodiment performed at the processing part 43 of the display device 4. The display device 4 executes the present routine every time receiving other-vehicle information from the object recognition device 3.

At step S1, the display device 4 judges if there are other vehicles running in the region in the front of the host vehicle outside the display range based on the relative position information of the other vehicles present in the surroundings of the host vehicle included in the other-vehicle information. If there are other vehicles running in the region in the front of the host vehicle outside the display range, the display device 4 proceeds to the processing of step S2. On the other hand, if there are no other vehicles running in the region in the front of the host vehicle outside the display range, the display device 4 proceeds to the processing of step S3.

Note that in the present embodiment, the region up to 100 meters in front of host vehicle 100 is inside the display range of the information display screen 44, so the region from 100 meters in front of the host vehicle 100 to the recognition limit of the object recognition device 3 (for example, 150 meters in front of the host vehicle 100) becomes the region in the front of the host vehicle outside the display range. Below, the region in front of the host vehicle 100 inside the display range of the information display screen 44 will be differentiated from the region in the front of the host vehicle outside the display range by referring to it as the "region in front of the host vehicle inside the display range".

At step S2, the display device 4 displays the other vehicles present in the region in front of the host vehicle inside the display range and the other-vehicle recognition marks 200 on the information display screen 44. Specifically, the display device 4 displays other vehicles at the relative positions of the other vehicles present in the region in front of the host vehicle inside the display range and displays other-vehicle recognition marks 200 at fixed positions of the driving lanes of the other vehicles running at the region outside the display range (in the present embodiment, the end parts at the front side in the direction of vehicle advance).

Note that in the present embodiment, the other-vehicle recognition marks 200 are made vehicle icons, so to keep from giving the driver an odd feeling as much as possible, the vehicle icons are displayed at fixed positions of the driving lanes so that their center points are positioned on the lane center lines of the driving lanes. Further, the vehicle icons are displayed at fixed positions of the driving lanes so that their orientations match the orientations of tangents of the lane center lines of the driving lanes.

Further, in the present embodiment, the fixed positions of the driving lanes (the end parts at the front side in the direction of vehicle advance) are made points on the driving lanes forming the boundary of the region in front of the host vehicle inside the display range and region outside the display range (point 100 meters in front of the host vehicle 100).

At step S3, the display device 4 displays the other vehicles present in the region in front of the host vehicle inside the display range on the information display screen 44. Specifically, the display device 4 displays that other vehicles at the relative positions of the other vehicles present in the region in front of the host vehicle inside the display range.

The display device 4 according to the present embodiment explained above is configured to display the host vehicle 100 and other vehicles running in the driving lanes on the information display screen 44 together with the driving lanes. Furthermore, the display device 4 is configured so that when other vehicles are present in a far region at the front side in the direction of vehicle advance outside the display range of the information display screen 44 (that is, region in the front of the host vehicle outside the display range), it displays the other-vehicle recognition marks 200 (in the present embodiment, the vehicle icons) at fixed positions of the driving lanes displayed on the information display screen 44 (in the present embodiment, the end parts at the front side in the direction of vehicle advance of the driving lanes).

Due to this, other vehicles running in a nearby region inside of the display range of the information display screen 44 can be displayed on the information display screen 44 while maintaining a suitable scale and securing ease of viewing of the screen. Further, other vehicles running in a far away region outside the display range of the information display screen 44 can be displayed as other-vehicle recognition marks 200 at the end parts at the front side in the direction of vehicle advance of the driving lanes in which the other vehicles are running, so the fact of recognition of other vehicles present far away can be conveyed to the driver.

Note that the present embodiment, if changing the way of viewing it, can be grasped as a display method displaying the host vehicle 100 and other vehicles running in the driving lanes on the information display screen 44 together with the driving lanes. Specifically, it can be grasped as a display method comprising judging whether other vehicles are present at a far region at a front side in a direction of vehicle advance outside a display range of the information display screen 44 and, when other vehicles are present in that region, displaying other-vehicle recognition marks 200 showing that the other vehicles are present in that region at fixed positions of their driving lanes displayed on the information display screen 44.

Second Embodiment

Next, a second embodiment of the present disclosure will be explained. The present embodiment differs from the first embodiment on the point of displaying the other-vehicle recognition mark 200 only at the host vehicle driving lane. Below, this point of difference will be focused on in the explanation.

In the above-mentioned first embodiment, as shown in FIG. 5, if there were other vehicles in the driving lanes at the region outside the display range of the information display screen 44, other-vehicle recognition marks 200 would be displayed at the end parts at the front side in the direction of vehicle advance of all of the driving lanes. This being so, as shown in FIG. 5, the other-vehicle recognition marks 200 would be displayed in a single horizontal line at the end parts at the front side in the direction of vehicle advance of the driving lanes.

Other vehicles running on driving lanes at the region outside the display range of the information display screen 44 actually almost never are running in a single horizontal line. For this reason, if ending up displaying the other-vehicle recognition marks 200 at the end parts at the front side in the direction of vehicle advance of the driving lanes in a single horizontal line, an odd feeling is liable to be given to the driver.

Figure 7:
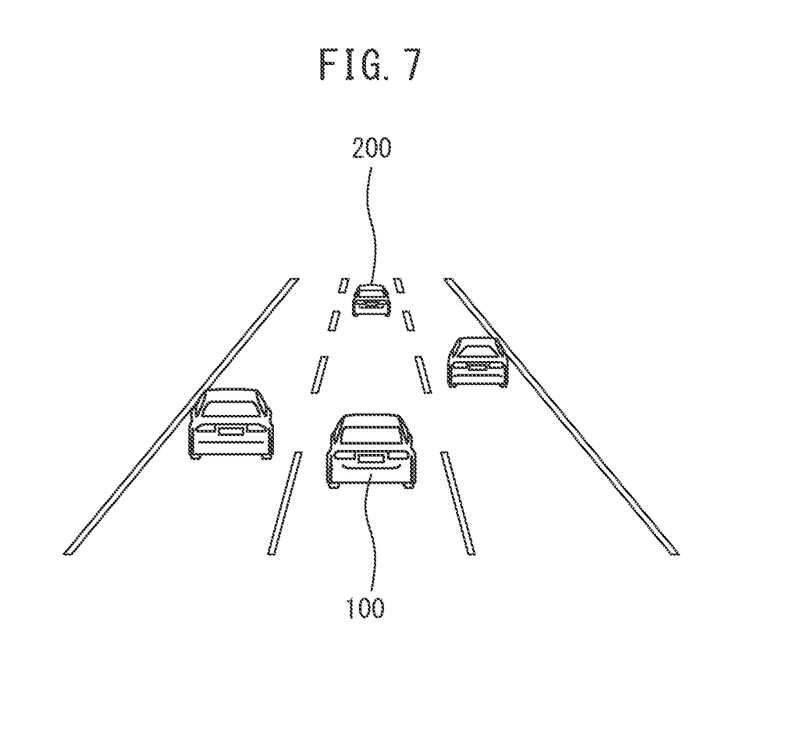
FIG. 7 is a view showing one example of an information display screen according to a second embodiment of the present disclosure showing other vehicles running in a region in the front of the host vehicle outside the display range as other-vehicle recognition marks at fixed positions of the driving lanes.

Therefore, in the present embodiment, as shown in FIG. 7, it was decided that only where there was another vehicle running in the host vehicle driving lane at the region outside the display range of the information display screen 44 would an other-vehicle recognition mark 200 be displayed at the end part at the front side in the direction of vehicle advance of the host vehicle driving lane. In other words, it was decided that even when there was another vehicle in a driving lane other than the host vehicle driving lane in the region outside the display range of the information display screen 44, an other-vehicle recognition mark 200 would not be displayed at the driving lane in which that other vehicle was running.

Due to this, it is possible to prevent other-vehicle recognition marks 200 from ending up being displayed in a single horizontal line at the end parts at the front side in the direction of vehicle advance of the driving lanes, so it is possible to prevent giving the driver an odd feeling.

Third Embodiment

Next, a third embodiment of the present disclosure will be explained. The present embodiment differs from the first embodiment on the point of making the display range at the front side in the direction of vehicle advance of the host vehicle driving lane longer than the display ranges at the front side in the direction of vehicle advance of the driving lanes other than the host vehicle driving lanes. Below, this point of difference will be focused on in the explanation.

Figure 8:
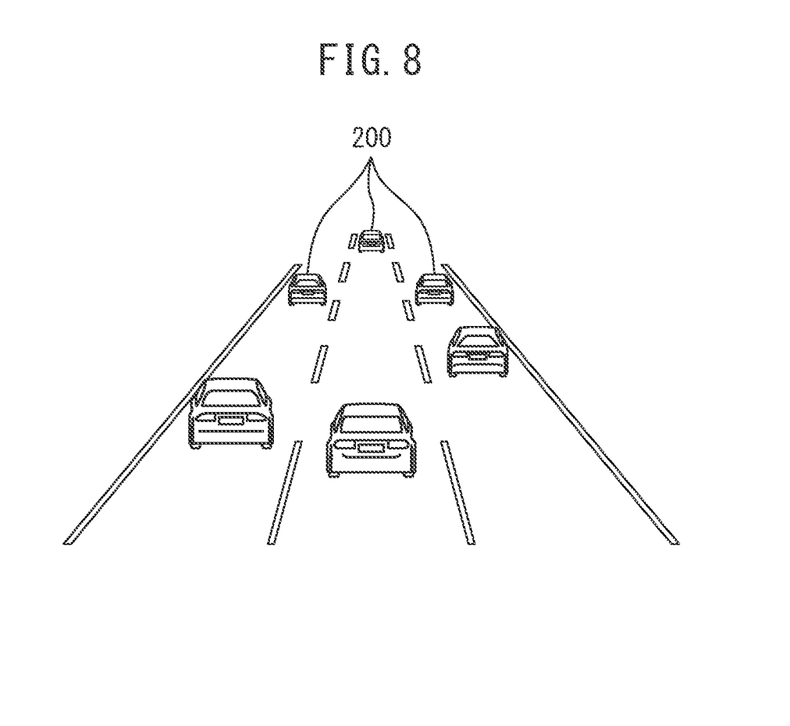
FIG. 8 is a view showing one example of an information display screen according to a third embodiment of the present disclosure showing other vehicles running in a region in the front of the host vehicle outside the display range as other-vehicle recognition marks at fixed positions of the driving lanes.

As explained above, as shown in FIG. 5, if ending up displaying other-vehicle recognition marks 200 in a horizontal single line at fixed positions of the driving lanes (the end parts at the front side in the direction of vehicle advance), the driver is liable to be given an odd feeling. Therefore, in the present embodiment, as shown in FIG. 8, the display range at the front side in the direction of vehicle advance of the host vehicle driving lane was made longer than the display ranges at the front side in the direction of vehicle advance of the driving lanes other than the host vehicle driving lanes.

Due to this, it is possible to make the fixed position of the host vehicle driving lane (the end part at the front side in the direction of vehicle advance) and the fixed positions of the adjacent driving lanes besides the host vehicle driving lane (the end parts at the front side in the direction of vehicle advance) different (the fixed position of the host vehicle driving lane becomes positioned further than the fixed positions of the adjacent driving lanes), so even if displaying other-vehicle recognition marks 200 at the end parts at the front side in the direction of vehicle advance of all of the driving lanes, it is possible to prevent the other-vehicle recognition marks 200 from being aligned in a single horizontal line. Therefore, it is possible to keep the driver from being given an odd feeling.

Note that, it is also possible to make the display range at the front side in the direction of vehicle advance of the host vehicle driving lane longer than the display ranges at the front side in the direction of vehicle advance of the driving lanes besides the host vehicle driving lane while, like in the above-mentioned second embodiment, displaying the other-vehicle recognition mark 200 only at the host vehicle driving lane.

Fourth Embodiment

Next, a fourth embodiment of the present disclosure will be explained. The present embodiment differs from the first embodiment on the point that when another vehicle which had been displayed at a fixed position of the driving lane has been switched with another vehicle, the other-vehicle recognition mark 200 is erased for a certain time or made to flash, then made to be redisplayed.

Figure 9A:
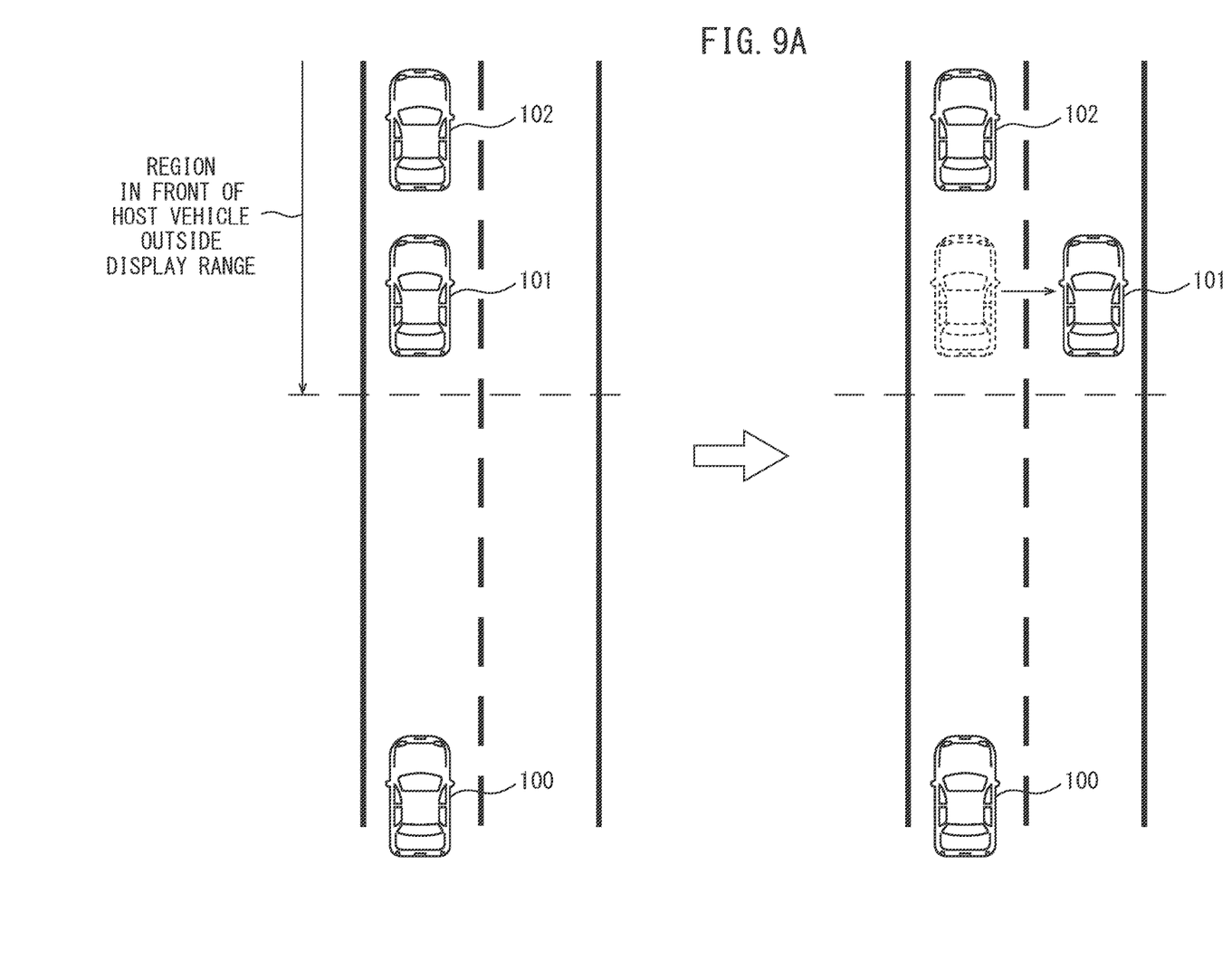
FIG. 9A is a view showing a state where one among two other vehicles running in a host vehicle driving lane in a region in the front of the host vehicle outside the display range has changed a lane.
Figure 9B:
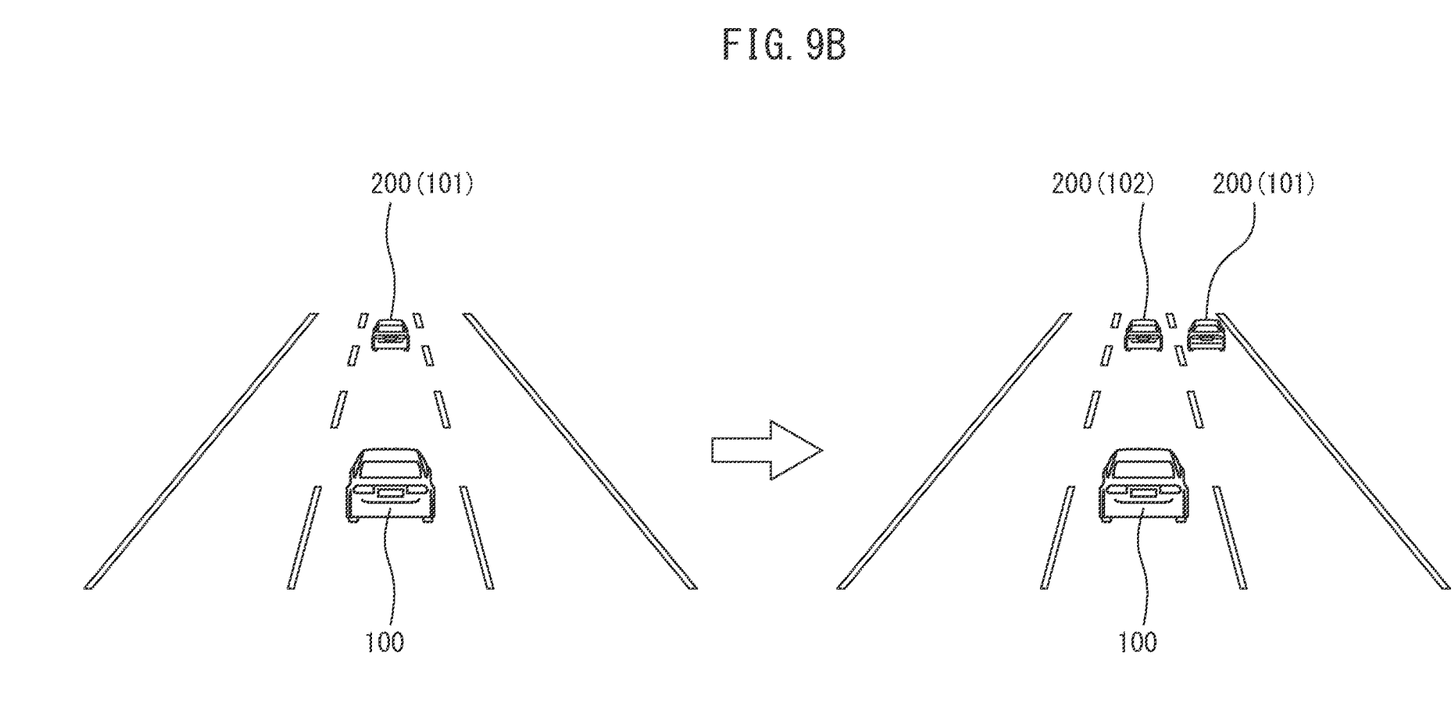
FIG. 9B is a view explaining a problem occurring when displaying other vehicles running in a region in the front of the host vehicle outside the display range as other-vehicle recognition marks at fixed positions of the driving lanes and one among two other vehicles running in a host vehicle driving lane in a region in the front of the host vehicle outside the display range has changed a lane.

FIG. 9A is a view showing a state where one among two other vehicles 101, 102 running in the host vehicle driving lane in a region in the front of the host vehicle outside the display range has changed a lane. FIG. 9B is a view explaining a problem occurring when displaying other vehicles running in a region in the front of the host vehicle outside the display range as other-vehicle recognition marks at fixed positions of the driving lanes and one among two other vehicles running in the host vehicle driving lane in a region in the front of the host vehicle outside the display range has changed a lane.

In the above-mentioned first embodiment, for example, as shown in FIG. 9A, when two other vehicles 101, 102 are running in the host vehicle driving lane in a region in the front of the host vehicle outside the display range, even when the other vehicle 101 at the near side when viewed from the host vehicle 100 changes lanes to move to an adjacent driving lane, the other vehicle 102 at the far side when viewed from the host vehicle 100 is running in the host vehicle driving lane, so as shown in FIG. 9B, an other-vehicle recognition mark 200 continues to be displayed at a fixed position of the host vehicle driving lane (the end part at the front side in the direction of vehicle advance). The display of the other-vehicle recognition mark 200 at the host vehicle driving lane does not change before and after the lane change of the other vehicle 101.

For this reason, the fact of the other vehicle 101 which had been displayed at a fixed position of the host vehicle driving lane (the end part at the front side in the direction of vehicle advance) being switched with another vehicle 102 could not be conveyed to the driver.

Therefore, in the present embodiment, when another vehicle which had been displayed at a fixed position of the driving lane is switched with another vehicle, it was decided to erase the other-vehicle recognition mark 200 which had been displayed at the fixed positions for a certain time or make it flash, then redisplay them.

Due to this, when another vehicle which had been displayed at a fixed position of the driving lane in the region in the front of the host vehicle outside the display range is switched with another vehicle, it is possible to convey the switch to the driver.

Figure 10:
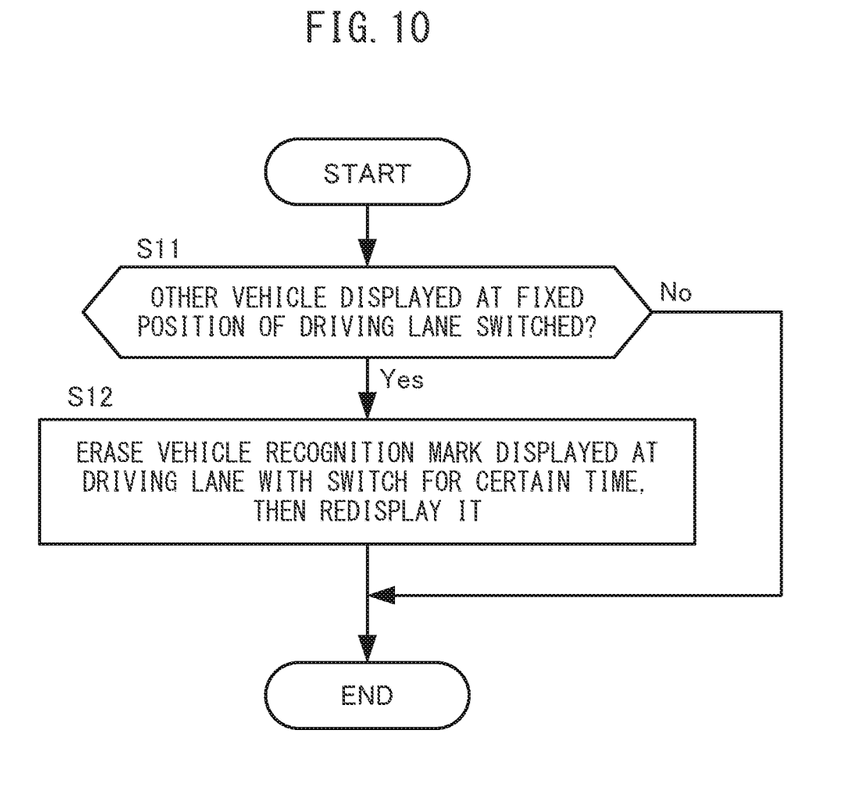
FIG. 10 is a flow chart explaining display processing according to a fourth embodiment of the present disclosure.

FIG. 10 is a flow chart explaining details of the display processing according to the present embodiment performed during the display of the other-vehicle recognition marks 200 in the processing part 43 of the display device 4. The display device 4 performs the present routine each time receiving other-vehicle information from the object recognition device 3.

At step S11, the display device 4 judges based on the identification information (ID numbers) of other vehicles contained in the other-vehicle information acquired from the object recognition device 3 whether another vehicle which had been displayed at a fixed position of the driving lane (the end part at the front side in the direction of vehicle advance) has been switched with another vehicle. Specifically, if among the other vehicles running in the region in the front of the host vehicle outside the display range of the host vehicle driving lane, the ID number of the other vehicle closest in distance with the host vehicle 100 differs from the time of the previous processing, the display device 4 judges that the other vehicle which had been displayed at the fixed position of the host vehicle driving lane (the end part of at the front side in the direction of vehicle advance) had been switched with another vehicle. For driving lanes besides the host vehicle driving lane, the presence of any switch is similarly judged.

If the other vehicle which had been displayed at a fixed position of the driving lane (the end part at the front side in the direction of vehicle advance) has been switched with another vehicle, the display device 4 proceeds to the processing of step S12. On the other hand, if the other vehicle which had been displayed at a fixed position of the driving lane (the end part at the front side in the direction of vehicle advance) has not been switched with another vehicle, the display device 4 ends the current processing.

At step S12, the display device 4 erases for a certain time the display of the other-vehicle recognition mark 200 which had been displayed at a fixed position of the driving lane or makes it flash when there was a switch, then redisplays it.

In this way, according to present embodiment, the display device 4 is configured so that when another vehicle with the shortest distance from the host vehicle 100 in each driving lane in a region in the front of the host vehicle outside the display range is switched with another vehicle, it erases the display of the other-vehicle recognition mark for a certain time or makes it flash, then redisplays it.

Due to this, when another vehicle which had been displayed at a fixed position of a driving lane is switched with another vehicle in a region in the front of the host vehicle outside the display range, that switch can be conveyed to the driver.

Above, embodiments of the present disclosure were explained, but the above embodiments only show part of the examples of application of the present disclosure and are not intended to limit the technical scope of the present disclosure to the specific configurations of the embodiments.

For example, in the above embodiments, when there is another vehicle in a region at the front side of the host vehicle 100 in the direction of vehicle advance inside the display range of the information display screen 44, even if there is another vehicle in the region in the front of the host vehicle outside the display range, it is also possible not to display the other-vehicle recognition mark 200. This is because in state where another vehicle which is running in the host vehicle driving lane and which the host vehicle 100 is following or another vehicle which is running in an adjacent driving lane and which is projected to have an effect on the driving of the host vehicle 100 is displayed on the information display screen 44, it is considered that there may be no need to necessarily display another vehicle present in a region in the front of the host vehicle outside the display range with less effect than these other vehicles.

What is claimed is:

1. A display device configured to display a host vehicle and other vehicles running in driving lanes together with the driving lanes on an information display screen, wherein
the display device is configured to display marks at the corresponding position of other vehicles within a display range of the information display for other vehicles present within the display range of the information display screen, and marks showing that other vehicles are present in a region, that is a far region at a front side in a direction of vehicle advance outside a display range of the information display screen and is a region closer to the host vehicle side than a recognition limit of an object recognition device, at end parts at the front side in the direction of vehicle advance of their driving lanes displayed on the information display screen, for other vehicles present at that region;

wherein the display device is further configured not to, when the other vehicles running in a driving lane other than the host vehicle driving lane are present in the region, display the marks showing that the other vehicles are present in the region.

2. The display device according to claim 1, wherein the display device is further configured to fix the marks at the end parts at the front side in the direction of vehicle advance of the driving lanes while the other vehicles are present in the region that is a far region at the front side in the direction of vehicle advance outside the display range of the information display screen and is a region closer to the host vehicle side than the recognition limit of the object recognition device.

3. The display device according to claim 1, wherein the display device is further configured to, when the other vehicles are present a point 100 meters or more in front of the host vehicle, display marks at a position corresponding to a point 100 meters in front of the host vehicle in the driving lanes displayed on the information display screen.

4. The method of operating a display device according to claim 1, further comprising the step of, when the other vehicles are present a point 100 meters or more in front of the host vehicle, displaying marks at a position corresponding to a point 100 meters in front of the host vehicle in the driving lanes displayed on the information display screen.

5. The display device according to claim 1, wherein the display device is further configured to, when the other vehicles running in the host vehicle driving lane are present in the region, display the marks showing that the other vehicles are present in the region.

6. A display device configured to display a host vehicle and other vehicles running in driving lanes together with the driving lanes on an information display screen, wherein the display device is configured to display marks at the corresponding position of other vehicles within a display range of the information display for other vehicles present within the display range of the information display screen, and marks showing that other vehicles are present in a region, that is a far region at a front side in a direction of vehicle advance outside a display range of the information display screen and is a region closer to the host vehicle side than a recognition limit of an object recognition device, at end parts at the front side in the direction of vehicle advance of their driving lanes displayed on the information display screen, for other vehicles present at that region;

wherein the display device is further configured to fix the marks at the end parts at the front side in the direction of vehicle advance of the driving lanes while the other vehicles are present in the region that is a far region at the front side in the direction of vehicle advance outside the display range of the information display screen and is a region closer to the host vehicle side than the recognition limit of the object recognition device; and the display device is further configured:

to fixedly display the marks showing that the other vehicles are present in the region when the other vehicles running in the host vehicle driving lane are present in the region; and not to display the marks showing that the other vehicles are present in the region when the other vehicles running in a driving lane other than the host vehicle driving lane are present in the region.

7. A method of operating a display device to display a host vehicle and other vehicles running in driving lanes together with the driving lanes on an information display screen in a vehicle comprising the steps of:

displaying marks at the corresponding position of other vehicles within a display range of the information display for other vehicles present within the display range of the information display screen, and marks on the display device showing that other vehicles are present in a region, that is a far region at a front side in a direction of vehicle advance outside a display range of the information display screen and is a region closer to the host vehicle side than a recognition limit of an object recognition device, at end parts at the front side in the direction of vehicle advance of their driving lanes displayed on the information display screen, for other vehicles present at that region; and when the other vehicles running in a driving lane other than the host vehicle driving lane are present in the region, not displaying the marks showing that the other vehicles are present in the region.

8. The method of operating a display device according to claim 7, further comprising the step of, when the other vehicles running in the host vehicle driving lane are present in the region, displaying the marks showing that the other vehicles are present in the region.

9. A method of operating a display device to display a host vehicle and other vehicles running in driving lanes together with the driving lanes on an information display screen in a vehicle comprising the steps of:

displaying marks at the corresponding position of other vehicles within a display range of the information display for other vehicles present within the display range of the information display screen, and marks on the display device showing that other vehicles are present in a region, that is a far region at a front side in a direction of vehicle advance outside a display range of the information display screen and is a region closer to the host vehicle side than a recognition limit of an object recognition device, at end parts at the front side in the direction of vehicle advance of their driving lanes displayed on the information display screen, for other vehicles present at that region;

fixing the marks at the end parts at the front side in the direction of vehicle advance of the driving lanes while the other vehicles are present in the region that is a far region at the front side in the direction of vehicle advance outside the display range of the information display screen and is a region closer to the host vehicle side than the recognition limit of the object recognition device;

fixedly displaying the marks showing that the other vehicles are present in the region when the other vehicles running in the host vehicle driving lane are present in the region; and not displaying the marks showing that the other vehicles are present in the region when the other vehicles running in a driving lane other than the host vehicle driving lane are present in the region.

* * * * *